United States Patent
Inam et al.

(10) Patent No.: US 11,973,683 B2
(45) Date of Patent: Apr. 30, 2024

(54) COMMUNICATION NODES AND METHODS PERFORMED THEREIN FOR HANDLING PACKETS IN AN INFORMATION CENTRIC NETWORK

(71) Applicant: Telefonaktiebolaget LM Ericsson (publ), Stockholm (SE)

(72) Inventors: Rafia Inam, Västerås (SE); Lian Araujo, Belem (BR); Hongxin Liang, Upplands Väsby (SE); Neiva Linder, Stockholm (SE); Leonid Mokrushin, Uppsala (SE); Aneta Vulgarakis Feljan, Stockholm (SE); Keven Wang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

(21) Appl. No.: 16/480,397

(22) PCT Filed: Feb. 20, 2017

(86) PCT No.: PCT/SE2017/050159
§ 371 (c)(1),
(2) Date: Jul. 24, 2019

(87) PCT Pub. No.: WO2018/151638
PCT Pub. Date: Aug. 23, 2018

(65) Prior Publication Data
US 2019/0356575 A1 Nov. 21, 2019

(51) Int. Cl.
*H04L 45/12* (2022.01)
*H04L 67/63* (2022.01)
(Continued)

(52) U.S. Cl.
CPC .............. *H04L 45/12* (2013.01); *H04L 67/63* (2022.05); *H04L 69/22* (2013.01); *H04W 8/04* (2013.01)

(58) Field of Classification Search
CPC ......... H04L 45/12; H04L 67/63; H04L 69/22; H04W 8/04
See application file for complete search history.

(56) References Cited

U.S. PATENT DOCUMENTS

| 2004/0109428 A1* | 6/2004 | Krishnamurthy ....... H04L 47/70 370/436 |
| 2007/0185989 A1* | 8/2007 | Corbett ............ G08B 13/19695 709/224 |

(Continued)

FOREIGN PATENT DOCUMENTS

EP 2784673 A1 * 10/2014 ......... G06F 9/45558

OTHER PUBLICATIONS

European Search Report for EP Application No. EP 17896806.1, dated Dec. 10, 2019, 9 Pages.
(Continued)

*Primary Examiner* — Ayanah S George
(74) *Attorney, Agent, or Firm* — Sage Patent Group

(57) ABSTRACT

Embodiments herein relate to a method performed by a communication node for handling packets in a communication network, which communication network is an ICN network. The communication node adds a time stamp to a packet, which packet is requesting content of a service or comprises at least a part of the content of the service and is of a format associated with the ICN network, and which time stamp is added into an ICN header of the packet. Furthermore, the communication node transmits the packet with the added time stamp towards another communication node.

20 Claims, 12 Drawing Sheets

(51) Int. Cl.
*H04L 69/22* (2022.01)
*H04W 8/04* (2009.01)

(56) References Cited

U.S. PATENT DOCUMENTS

| | | | |
|---|---|---|---|
| 2009/0253526 A1* | 10/2009 | Koudele | A63B 69/3658 |
| | | | 473/155 |
| 2013/0219081 A1* | 8/2013 | Qian | H04L 67/63 |
| | | | 709/241 |
| 2013/0262698 A1 | 10/2013 | Schwan et al. | |
| 2015/0215206 A1 | 7/2015 | Solis et al. | |
| 2016/0182680 A1 | 6/2016 | Stapp et al. | |

OTHER PUBLICATIONS

Communication pursuant to Rule 70(2) and 70a(2) EPC for EP Application No. 17896806.1, dated Jan. 9, 2020, 1 Page.
International Search Report and Written Opinion of the International Searching Authority, PCT/SE2017/050159, dated Oct. 24, 2017, 14 pages.

\* cited by examiner

COMMUNICATION NODES AND METHODS PERFORMED THEREIN FOR HANDLING PACKETS IN AN INFORMATION CENTRIC NETWORK

This application is a 35 U.S.C. § 371 national stage application of PCT International Application No. PCT/SE2017/050159 filed on Feb. 20, 2017, the disclosure and content of which is incorporated by reference herein in its entirety.

TECHNICAL FIELD

Embodiments herein relate to a communication node, a handling communication node and methods performed therein for communication. Furthermore, a computer program and a computer readable storage medium are also provided herein. In particular, embodiments herein relate to handling packets in a communication network.

BACKGROUND

In a typical radio communication network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

Packets related to e.g. a service are transported in a Core Network along paths in a transport network also referred to as a communication network herein. Today two broad categories of transport networking are available. In one, called automatic, path selection is automatic, usually distributed, and, usually, follows the shortest path paradigm. Internet Protocol (IP) routing, IP/Multiprotocol label switching (MPLS), and Ethernet Shortest Path Bridging (SPB) clearly fall into this category. The other approach, called traffic engineering, is more circuit aware and relies on setting up explicit paths across the network with usually resource reservation included. Generalized MPLS (GMPLS), MPLS-Transport Profile (TP), Provider Backbone Bridges Transport Profile (PBB-TP) and Resource Reservation Protocol (RSVP) all fall into this category.

Information Centric Networking (ICN) is a new networking paradigm. Instead of focusing on connecting communicating endpoints (as traditional networking protocols, such as IP do), ICN focuses on the content object that should be retrieved. In ICN networking messages are routed based on the globally unique names of content objects rather than on endpoint addresses referring to physical boxes. Content Centric Networking (CCN) is one approach within the ICN paradigm.

In CCN a Content Object is retrieved by issuing an Interest packet to the network containing the name of the Content Object. Such an Interest packet is routed by the network towards the source/publisher of the object. Communication nodes along the path check if they have a cached copy of the object. If so they will respond to the Interest packet with a Data packet or a content packet containing the requested Content Object and the Interest packet will not be propagated any further, see FIG. 1. The routing is helped by the name being a structured name, similar to domain names, but with richer syntax. Routers maintain a Forwarding Information Base (FIB) about where, i.e. the interface or face, to forward which name or name prefix. The routers along the path of the Interest packet keep a record of the Interest packets they have forwarded (the face where it came from and what Content Object it was naming) in their Pending Interest Table (PIT). If other Interest packets to the same name arrive to the router, it does not forward them, just notes them in the PIT besides the entry for this name, this is called Interest aggregation. This way the PIT entries for the same name may form a tree in the network with receivers at the leaves.

When the Interest packet reaches an endpoint (or router) having a copy of the Content Object (perhaps cached), the Interest packet is responded to with a Data packet, which is propagated backwards along the path the Interest packet took. The backward path is learned from the entries the Interest packet left in the PIT of the routers along the path. If there were multiple Interest packets arriving at a router for this name, the Data packet containing the Content Object is replicated towards each respective face/direction, where the Interest packets came from. After forwarding a Content Object matching a pending Interest, the routers delete the corresponding entry in the PIT, thus these entries are expected to be short-lived. When the original endpoint(s) generating the Interest packet(s) receives the Content Object the transaction is considered closed.

The request aggregation mechanism forms a hierarchical tree in the ICN network where interest packets are aggregated and content packets are de-aggregated at each level of the tree. This allows ICN networks to scale with increasing number of clients.

One benefit of ICN is in distributing the same information to multiple places in the network. Since routers may cache Content Objects besides forwarding them, Content Objects need not traverse the entire network every time someone becomes interested in them—a local cached copy suffices. Another advantage with ICN is the aggregation of Interest packets, in the case of a flash crowd event where suddenly thousands of endpoints are requesting the same content the source will only be reached by one request for the content, all other requests will be served from the caches of routers along the path towards the source.

Currently Internet networking approach is IP host based and allows End to End (E2E) session links establishment and communication. In contrast, Information centric networking (ICN) focuses on the request (interest packet) and fetching (data packet) of content from the communication network, i.e., where the content is placed or cached is irrelevant, the important is to get the right information with guaranteed Quality of Service (QoS). The later implies that ICN will be performed in a hop by hop fashion, making the principle of E2E session links disappear. Advantages of hop by hop based networking are recognized especially for broadcast mechanism, permitting a geographical adaptive cache distribution of content on demand. A side effect of this approach that lies in the uncertainties is to apply time measurements of packets, such as packet round trip time (RTT) measurements, necessary for making network decisions concerning the handling of packets e.g. dropping packets, determining shortest path, or as a parameter for congestion control algorithms. Due to these uncertainties the packets may be handled in a non-optimal manner resulting in a reduced or limited performance of the communication network.

SUMMARY

An object of embodiments herein is to provide a mechanism for enabling an improved performance of the communication network in an efficient manner.

According to an aspect the object is achieved by providing a method performed by a communication node for handling packets in a communication network, which communication network is an ICN network. The communication node adds a time stamp to a packet, which packet is requesting content of a service or comprises at least a part of the content of the service and is of a format associated with the ICN network, and which time stamp is added into an ICN header of the packet. The communication node further transmits the packet with the added time stamp towards another communication node.

According to another aspect the object is achieved by providing a method performed by a handling communication node for handling packets in a communication network, which communication network is an ICN network. The handling communication node receives a packet with a time stamp, which packet is related to a service and is of a format associated with the ICN network and the time stamp is comprised in an ICN header of the packet. The handling communication node performs a network decision taking the time stamp in the packet into account, which network decision relates to handling the packet and/or other packets.

According to yet another aspect the object is achieved by providing a communication node for handling packets in a communication network, which communication network is an ICN network. The communication node is configured to add a time stamp into an ICN header of a packet, which packet is requesting content of a service or comprises at least a part of the content of the service and is of a format associated with the ICN network; and to transmit the packet with the added time stamp towards another communication node.

According to still another aspect the object is achieved by providing a handling communication node for handling packets in a communication network. The communication network is an ICN network. The handling communication node is configured to receive a packet with a time stamp, which packet is related to a service and is of a format associated with the ICN network and the time stamp is comprised in an ICN header of the packet. The handling communication node is further configured to perform a network decision taking the time stamp in the packet into account, which network decision relates to handling the packet and/or other packets.

It is furthermore provided herein a computer program comprising instructions, which, when executed on at least one processor, cause the at least one processor to carry out any of the methods above, as performed by the communication nodes. It is additionally provided herein a computer-readable storage medium, having stored thereon a computer program comprising instructions which, when executed on at least one processor, cause the at least one processor to carry out the method according to any of the methods above, as performed by the communication nodes.

Embodiments herein allow reduction of the network load by performing network decisions of handling packets based on the time stamp, e.g. dropping expired packets sent by real-time applications at an earlier stage. Additionally or alternatively, some embodiments may improve performance of the communication network by performing network decisions of handling packets based on the time stamp such as change a shortest path as a known shortest path can become congested as all content starts moving along the shortest path. Thus, the overall available capacity of the communication network may increase for the service and/or other applications, and thus the embodiments herein enable an improved performance of the communication network in an efficient manner.

BRIEF DESCRIPTION OF THE DRAWINGS

Embodiments will now be described in more detail in relation to the enclosed drawings, in which.

DETAILED DESCRIPTION

Figure 1:
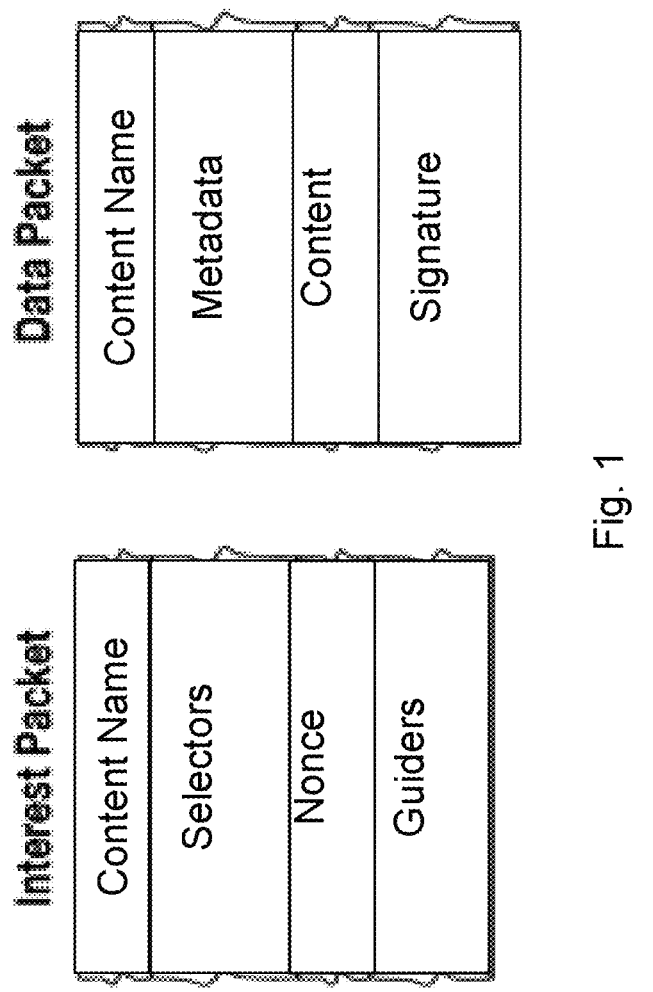
FIG. 1 is a block diagram depicting packets of an ICN.
Figure 2:
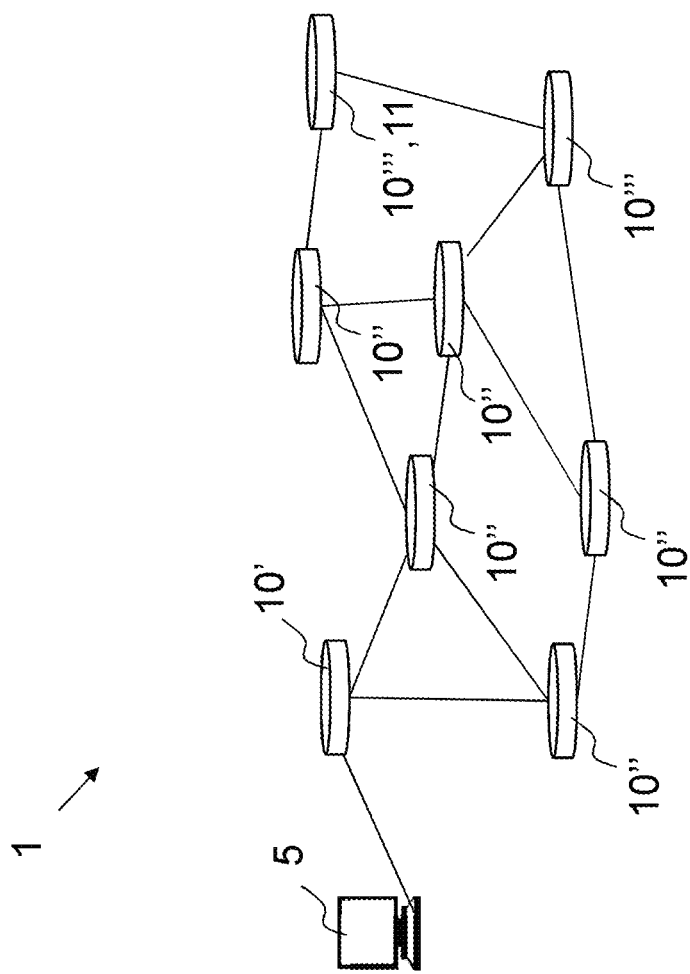
FIG. 2 is a schematic overview depicting a communication network according to embodiments herein.

Embodiments herein relate to communication networks in general. FIG. 2 is a schematic overview depicting a communication network 1 according to embodiments herein. The communication network is an Information Centric Networking (ICN) network such as a CCN. In ICN messages are routed based on globally unique names of content objects rather than on endpoint addresses referring to physical boxes. Named Data Network (NDN) is a specific architecture design under the broad ICN concept. Communication in NDN is driven by receivers i.e., data consumers, through the exchange of two types of packets: Interest packets and Data packets. Both types of packets carry a name that identifies a piece of data that can be transmitted in one Data packet i.e. the content. Overview of the packets:

Interest packet: A consumer puts the name of a desired piece of data or content into an Interest packet and sends it to the communication network. Communication nodes e.g. routers use this name to forward the Interest packet toward the data producer(s) e.g. a content provider.

Data packet: Once the Interest packet reaches a communication node that has the requested data, that communication node will return a Data packet that contains both the name of the content and at least part of the content, together with a signature by the producer's key which binds the two together. This Data packet follows in reverse the path taken by the Interest packet to get back to the requesting consumer.

Since both ICN and NDN aim for a broad use case, not only static content like pictures on web site, on demand video clips, but also time sensitive data like video stream, real-time sensor data, etc may be requested. A prioritization of each interest packet may be indicated such that communication nodes may handle interest packets differently.

The communication network 1 comprises a plurality of communication nodes. A communication node 10 may be referred to as an originating communication node 10', an intermediate communication node 10" or a receiving communication node 10''' depending on where in a flow of packets the communication node is present. Furthermore, it is also herein disclosed a communication node handling packets, i.e. the communication node performs a network decision relating to handling one or more packets, the communication node may then be denoted a handling communication node.

The communication node 10 may be a router, a switch, or any node with a scheduler or a packet handler transporting one or more packets within the communication network 1. The communication node may further e.g. be a transmission and reception point, a radio access network node such as Wireless Local Area Network (WLAN) access point or Access Point Station (AP STA), an access controller, a base station e.g. a radio base station such as a NodeB, an evolved Node B (eNB, eNode B), a Next Generation eNode B (gNB, gNodeBs), a base transceiver station, a radio remote unit, an Access Point Base Station, a base station router, a transmission arrangement of a radio base station, a stand-alone access point or any other network unit capable of communicating with a communication device depending e.g. on the radio access technology and terminology used.

A communication device 5, such as a mobile station, a computer, a TV, a non-access point (non-AP) STA, a STA, a user equipment and/or a wireless terminal, requests content e.g. a streaming movie, download a file, of a service within the communication network. It should be understood by the skilled in the art that "communication device" is a non-limiting term which means any terminal, communications terminal, user equipment, or node e.g. smart phone, laptop, mobile phone, sensor, relay, or mobile tablet.

The communication terminal 5 transmits packets requesting the content of the service. These packets are denoted interest packets. The packets are transported over the communication network 1 requesting content from a content communication node 11 or an application communication node also being an example of a communication node. According to the ICN each communication node receiving the interest packet checks whether the content is cached in its memory, e.g. based on the name of the content. In case the content is stored in the communication node, the communication node transmits a content packet or data packet back towards the requesting communication device 5, which data packet comprises at least part of the requested content.

According to embodiments herein packets, both data packets and interest packets, are handled in an efficient manner providing an ICN that is efficiently handling content of a service in the ICN network. Embodiments herein adds a time dimension when handling packets in the communication network 1. Embodiments herein disclose the communication node 10 that adds a time stamp to a header of a packet being a packet requesting content of a service or a packet comprising at least a part of the content of the service i.e. the packet is related to the service. The packet is of a format associated with the ICN network. The communication node 10 then transmits the packet with the added time stamp towards another communication node, such as the content communication node 11. The packet may be received by a handling communication node such as an originating or initial communication node, an intermediate located communication node or the content communication node 11. The handling communication node then performs a network decision based on at least the time stamp in the packet, which network decision relates to handling the packet and/or other packets. E.g. the handling communication node may, taking the time stamp into account, determine whether the packet should be dropped, delayed, or up-prioritized compared to other packets. Dropping expired packets sent by real-time applications at an earlier stage, before it reaches an originating communication node, reduces the network load and, thus, the overall available capacity of the network will increase for other applications. Also, early feedback about expired and dropped packets to a source application enables reconfiguration of data streams and/or latency budgets.

Furthermore, the handling communication node may determine when the time stamp indicates a hop time or is used to determine the hop time to reroute other (upcoming) packets along a different way, e.g. the time stamp is used to determine congestion and change of shortest path since due to congestion, the content can take longer time to deliver to the user resulting in a reduced or limited performance of the communication network. Hence, better congestion control may be achieved since the content can be downloaded from the path that has low load, and a possibility to provide low and improved latency of real-time streaming in ICN may be achieved since the content will be downloaded using the path taking less time.

Figure 3:
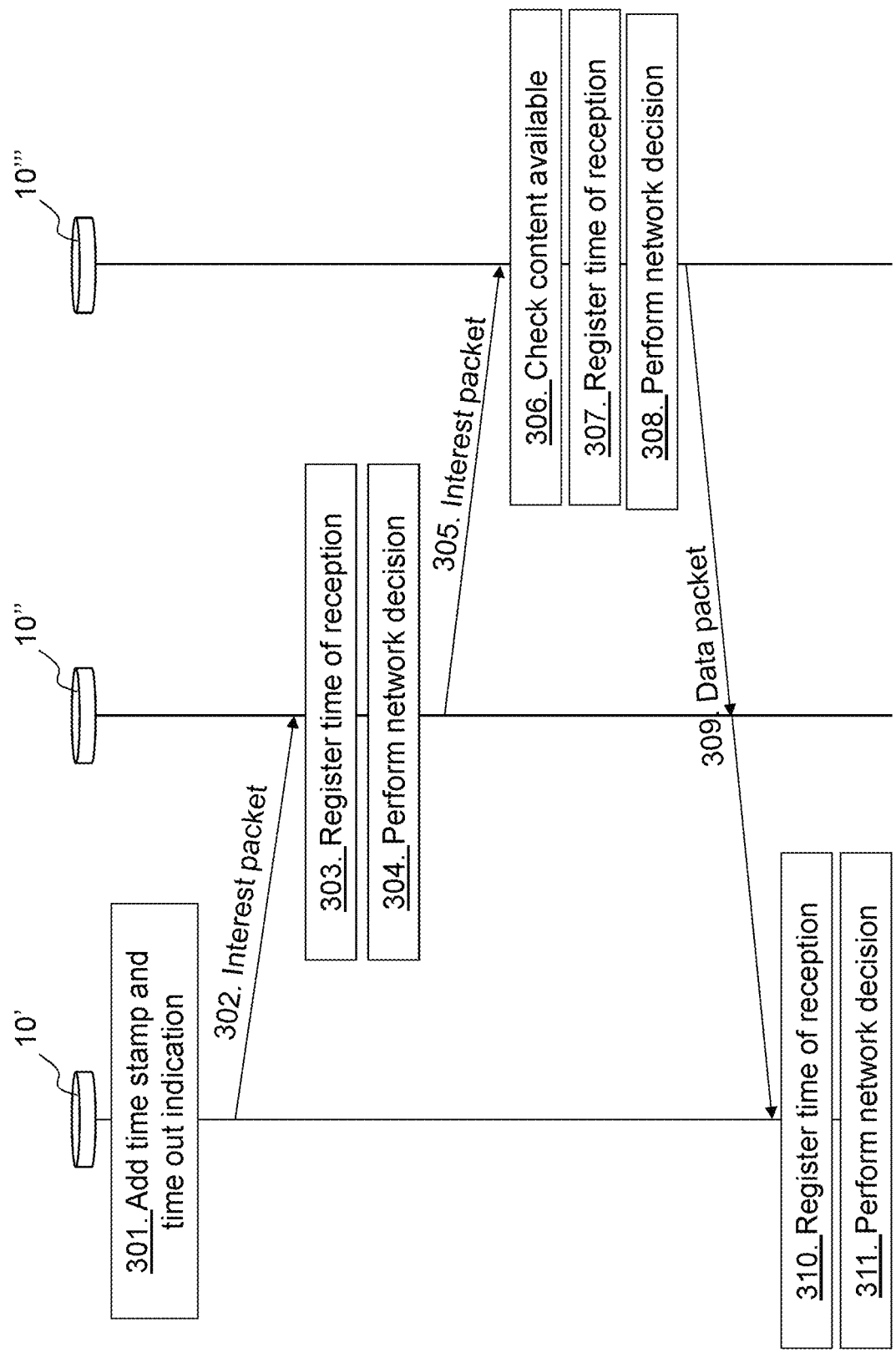
FIG. 3 is a combined flowchart and signalling scheme according to some embodiments herein.

FIG. 3 is a combined signaling scheme and flowchart according to some embodiments herein wherein the time stamp is used to determine whether to prioritize, delay or drop packets. It should be noted that in NDN Packet Format Specification, there is one header namely "InterestLifetime" that indicates the (approximate) time remaining before the Interest times out. The value is the number of milliseconds. The timeout is relative to the arrival time of the Interest packet at the current communication node. But there are several limitations:

- There is no consideration of time spent travelling through the communication network. It only counts number of millisecond until the interest packet expiration, but usually the clock of source communication node, which sends the interest packet, is not synchronized with the clock of the target communication node, which handles the interest packet. Even with Network Time Protocol (NTP) based clock synchronization, the difference between clocks in two communication nodes could be tens of milliseconds.
- Since time information in InterestLifetime is not accurate enough, it can't be used to do fine grained control of interest packet prioritization for time sensitive applications.

Action 301. An originating communication node 10' adds a time stamp into the ICN header of an interest packet, which interest packet is of the format of the ICN. The originating communication node 10' further adds a time out indication to the packet indicating when the packet should be timed out. The time out indication may be a time according to sync clock or a time interval relative the time stamp. For example, the originating communication node 10' may add a first time stamp, T0, indicating the absolute time when the interest packet is sent, and the time out indication being a deadline, DT, indicating a time interval relative to first time stamp after which the interest expires.

Action 302. The originating communication node 10' further transmits the interest packet with the added time stamp and time out indication towards another communication node such as the content communication node 11.

Action 303. An intermediate communication node 10" receives the interest packet and registers a received local time, LT, indicating a time of reception of the packet at the intermediate communication node 10". The time of reception may be synchronized with a clock in the communication network.

Action 304. The intermediate communication node 10" may perform a network decision comprising e.g. delaying, dropping or prioritizing the interest packet based on a delivery time indicating a time to deliver content of the service to an originating client or communication node. The time stamp, and the time of reception indicates the delivery time. This delivery time may then be compared with the time out indication. For example, the intermediate communication node 10" may, based on the time stamp, the time out indication and the time of reception, determine whether to drop the interest packet or forward the interest packet. A time, denoted as tp, to process the interest packet within the intermediate communication node itself may also be taken into account. Thus, the intermediate communication node 10" may drop the interest packet if T0+ED+tp<2*LT, wherein ED is the_absolute_estimated deadline, set initially to T0+DT by the client, where DT is the same as above.

Action 305. The intermediate communication node 10" may e.g. in case T0+ED+tp≥2*LT forward the interest packet towards a communication node such as the content communication node 11. The intermediate communication node 10" may then rewrite the ICN header with new values of the time stamps e.g. a new time for transmitting the interest packet from the intermediate communication node 10", new T0, and a new time out indication being reduced with the time interval between the originating communication node 10' and the intermediate communication node 10". This new time and/or time out indication may also take a parameter taking sizes of packets and/or bandwidths into account. Thus, the new time out indication EDn may be defined as:

EDn=ED−(LT−T0)*C,
where
the parameter C is a coefficient C=Cs/Cb, where
Cs=size_of_interest_packet/size_of_data_packet,
Cb=downlink_bandwidth/uplink_bandwidth.

This approach has an assumption that fluctuations in uplink speed are proportional to fluctuations in downlink speed of the same link. Also that the size of data packet is known or at least can be roughly guessed by the intermediate communication node 10".

Action 306. A receiving communication node 10'" received the interest packet and checks whether content exist in the receiving communication node 10'"; and in that case, the receiving communication node 10'" may initiate transmission of the content back towards the originating communication node 10' in one or more data packets.

Action 307. Furthermore, the receiving communication node 10'" may perform, just as the intermediate communication node 10", a check whether it is possible to deliver the content before being out of time. Hence, the receiving communication node 10'" receives the interest packet and registers a received local time, LT, indicating the time of reception of the interest packet at the receiving communication node 10'".

Action 308. The receiving communication node 10'" may further perform a network decision comprising e.g. delaying, dropping or prioritizing the interest packet based on a delivery time indicating the time to deliver content of the service to the originating client or communication node. The time stamp, and the time of reception indicates the delivery time and may be compared with a threshold, which threshold is based on the time out indication.

Action 309. The receiving communication node 10'" may then transmit the data packet to the originating communication node 10' via the intermediate communication node 10". Even if not showed the intermediate communication node 10" may additionally perform a check whether it is possible to deliver the content before being out of time as indicated by the time out indication.

Action 310. The originating communication node 10' may receive the data packet and may register a received local time, LT, indicating the time of reception of the data packet at the originating communication node 10'. This time of reception may be the time stamp of the data packet.

Action 311. The originating communication node 10' may further perform a network decision comprising e.g. delaying, dropping or prioritizing the data packet based on the time out indication, the time stamp and the time of reception indicating the delivery time. For example, in case the originating communication node 10' estimates that the time to deliver the data packet is below the time out indication the originating communication node 10' may wait to deliver the data packet e.g. in case other clients may send an interest packet for that specific content and hence delay the transmission. Alternatively, the originating communication node 10' may prioritize transmission of the data packet in case the originating communication node 10' estimates that the time to deliver the data packet is equal to or just within the time out indication and the originating communication node 10' has data packets that may be put on hold, e.g. change order of the data packets in a transmission queue, and still be delivered within time indicated by a time out indication for that data packet.

Embodiments herein may provide a reduction of the network load by dropping expired packets sent by real-time applications at an earlier stage (before it reaches the originating communication node). Thus, the overall available capacity of the network will increase for other applications. Furthermore, embodiments herein may provide an early feedback about expired and dropped packets to the source application, so that the latter can reconfigure data streams and/or latency budgets accordingly; and the proposed method may be transparent and compatible to the communication nodes, i.e. routers/firewalls/gateways, which do not implement this method.

Figure 4:
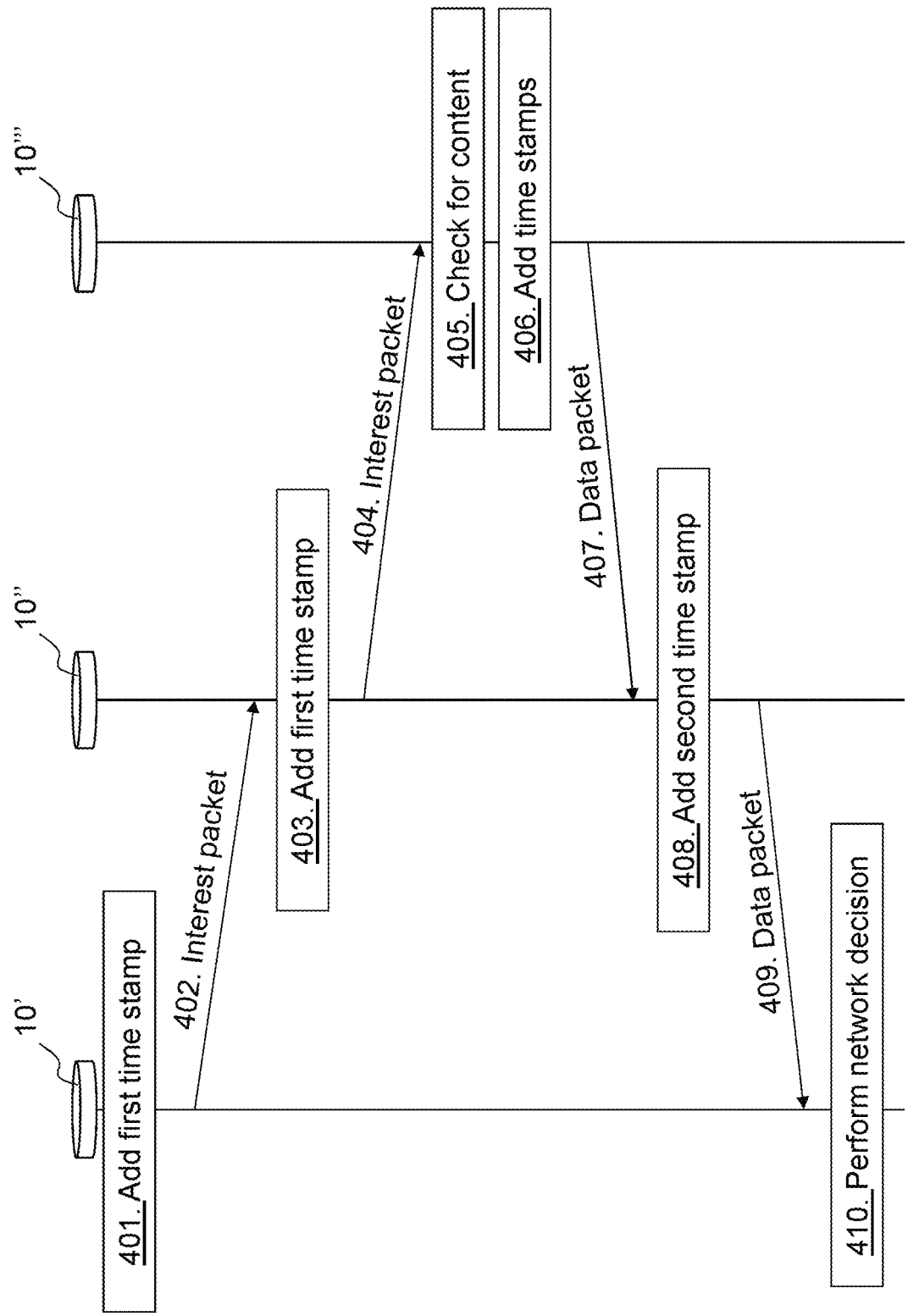
FIG. 4 is a combined flowchart and signalling scheme according to some embodiments herein.

FIG. 4 is a combined flowchart and signaling scheme illustrating some embodiments herein to e.g. determine when to use a shorter path in the ICN domain with regards to "time". This is enabled by the insertion of the time stamp in the ICN packets and may be used for detecting traffic congestion in specific links, essential information for optimizing the forwarding functionality in the ICN nodes and similar.

Action 401. An originating communication node 10' adds a first time stamp to an interest packet requesting content of a service. The first time stamp is added into the ICN header of the interest packet. The first time stamp may be indicating a time of transmission of the interest packet from the originating communication node 10'.

Action 402. The originating communication node 10' transmits the interest packet. The originating communication node 10' may store information associated with the packet in a Forwarding Information Base, FIB, entity at the originating communication node, which FIB entity is responsible for deciding which face or port packets will be forwarded.

Action 403. An intermediate communication node 10" adds an additional first time stamp to the interest packet, which interest packet is requesting content of the service and is of the format associated with the ICN. The additional first time stamp is added into the ICN header of the interest packet. The additional first time stamp may be indicating a time of transmission of the interest packet from the intermediate communication node 10" or indicating a time of reception of the interest packet at the intermediate communication node 10". The first time stamp may be an absolute time value.

Action 404. The intermediate communication node 10" transmits the interest packet with the added first time stamp and the additional first time stamp towards another communication node. The intermediate communication node 10" may store information associated with the interest packet in a FIB entity at the intermediate communication node 10", which FIB entity is responsible for deciding which face or port interest packets will be forwarded.

Action 405. A receiving communication node 10''' checks whether content exist in the receiving communication node 10'''; and in that case transmits the content back towards the originating communication node 10' in one or more data packets. The receiving communication node 10''' comprising the content may thus receive the interest packet and initiate transmission of the content in data packets back towards the originating client or communication node.

Action 406. The receiving communication node 10''' also adds the first and the additional first time stamp to the one or more data packets.

Action 407. The receiving communication node 10''' comprising the content, thus, transmits a data packet comprising at least part of the content towards the originating communication node 10' and the data packet is of the format associated with the ICN network.

Action 408. The intermediate communication node 10" may then receive the data packet and add a second time stamp to the data packet, which data packet is associated with the interest packet e.g. based on the name of the content. The second time stamp may be indicating a time of reception of the data packet at the intermediate communication node. The second time stamp may be an absolute time value or an interval value indicating a per hop time for e.g. the RTT for the intermediate communication node. The round trip time may be computed and stored in e.g. the FIB. Then this can be used in future to decide which face of the FIB to be used for other packets. Calculation of round trip time may be done in a logical component.

Action 409. The intermediate communication node 10" may then forward the data packet with the first time stamp, the second time stamp, and the additional first time stamp towards the originating communication node 10'.

Action 410. The originating communication node 10' may receive the data packet with the first time stamp, the second time stamp, and the additional first time stamp comprised in the ICN header of the packet. The originating communication node 10' may then register an ending time stamp when receiving the data packet. The originating communication node 10' may then perform a network decision comprising making a handling decision based on the first and the ending time stamp and/or the additional and second time stamp, which network decision relates to handling the packet and/or other packets. The network decision may relate to calculate a shortest path or relate to congestion control.

It should be further noted that the intermediate communication node 10" may perform a network decision such as change packet path based on the additional first time stamp and the second time stamp indicating the a round trip time.

Thus, in this illustrated embodiment a handling communication node, illustrated as the originating communication node or the intermediate communication node, may determine when the time stamps indicate a hop time or are used to determine the hop time to reroute other (upcoming packets) along a different way e.g. the time stamps are used to determine congestion or change of shortest path.

Thus, the originating communication node 10' may when the data packet arrives at the originating node 10' then with a logical component placed, e.g., in the FIB of that originating node 10', process the time stamps, such as the first and second time stamp being the ending time stamp, from ICN packets and apply for decision making, like which FIB entity is responsible for deciding which face or port packets will be forwarded. It can be used for calculating shortest path, congestion control, etc. These embodiments may provide: a better congestion control as the content can be downloaded from the path that has low load; a possibility to provide low latency of real-time streaming in ICN since the content will be downloaded using the path taking less time. The proposed method may be transparent and compatible to the communication nodes, e.g. routers/firewalls/gateways, which do not implement this method. Hence these embodiments disclose a method to determine and then use e.g. shorter path in the ICN domain with regards to time and this is enabled by the insertion of the time stamp in the ICN header of the packets. This approach may also be used for detecting traffic congestion in specific links, essential information for optimizing the forwarding functionality in the ICN nodes and similar.

Figure 5:
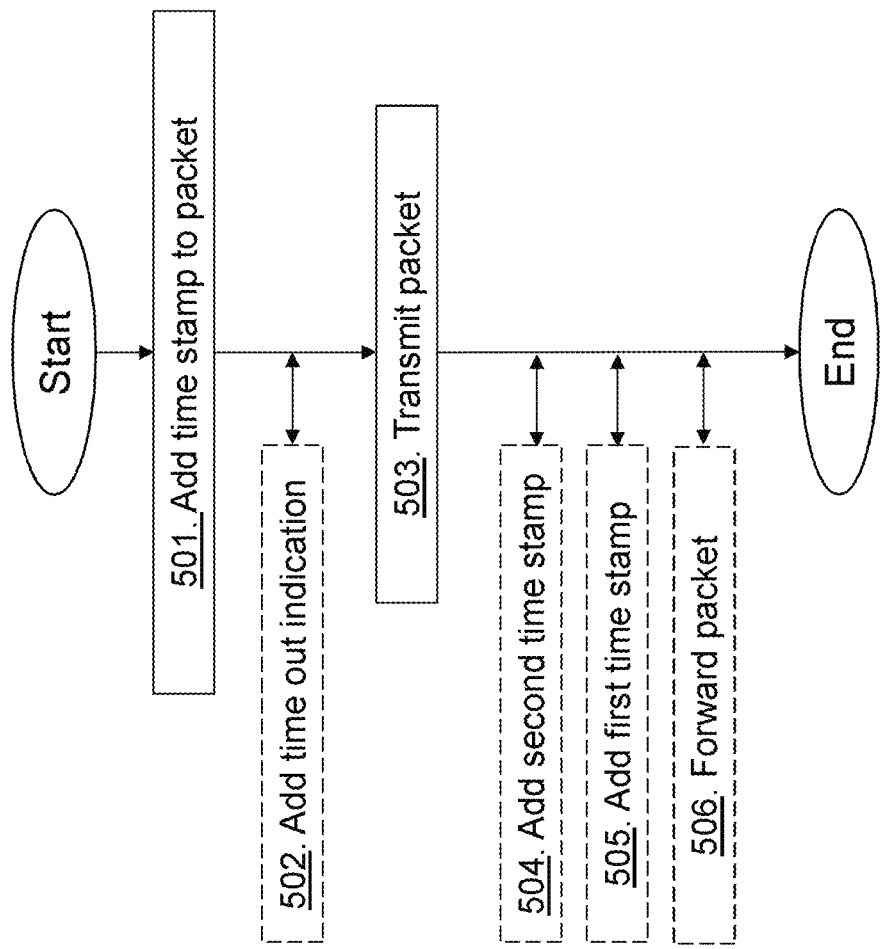
FIG. 5 is a flowchart depicting a method performed by a communication node according to embodiments herein.

The method actions performed by the communication node 10, exemplified herein as the originating communication node 10', the intermediate communication node 10", or the receiving communication node 10''', for handling packets in the communication network 1 according to some embodiments will now be described with reference to a flowchart depicted in FIG. 5. As stated above the communication network is an ICN network. The actions do not have to be taken in the order stated below, but may be taken in any suitable order. Actions performed in some embodiments are marked with dashed boxes.

Action 501. The communication node 10 adds the time stamp to the packet, which packet is related to the service i.e. requesting content of the service or comprises at least a part of the content of the service. The packet is of the format associated with the ICN network, and which time stamp is added into the ICN header of the packet.

Action 502. The communication node 10 may, wherein the time stamp indicates when the packet is transmitted from the communication node, add also a time out indication to the packet indicating when the packet should be timed out. The time out indication may be a time according to a synchronized clock or a time interval relative the time stamp, e.g. countdown interval.

Action 503. The communication node 10 may transmit the packet with the added time stamp towards another communication node such as the content communication node 11. The packet may also comprise the time out indication.

Action 504. The communication node 10 may, wherein the packet is an interest packet requesting content of the service and the added time stamp is a first time stamp, add a second time stamp to a data packet associated with the interest packet, i.e. associated with the same content name. The data packet comprises at least a part of the content of the service and the first time stamp of the interest packet and is of the format associated with the ICN network.

Action 505. The communication node 10 may then additionally add the first time stamp of the interest packet also to the data packet unless the data packet already comprises the first time stamp.

Action 506. The communication node 10 may further forward the data packet with the first and second time stamps.

The first time stamp is indicating a time of reception or transmission of the interest packet at the communication node 10 and the second time stamp is indicating a time of reception or transmission of the data packet at the communication node. The time stamp may be an absolute time value or an interval value indicating a per hop time such as a delta T for a one way hop or a RTT for a hop.

Figure 6:
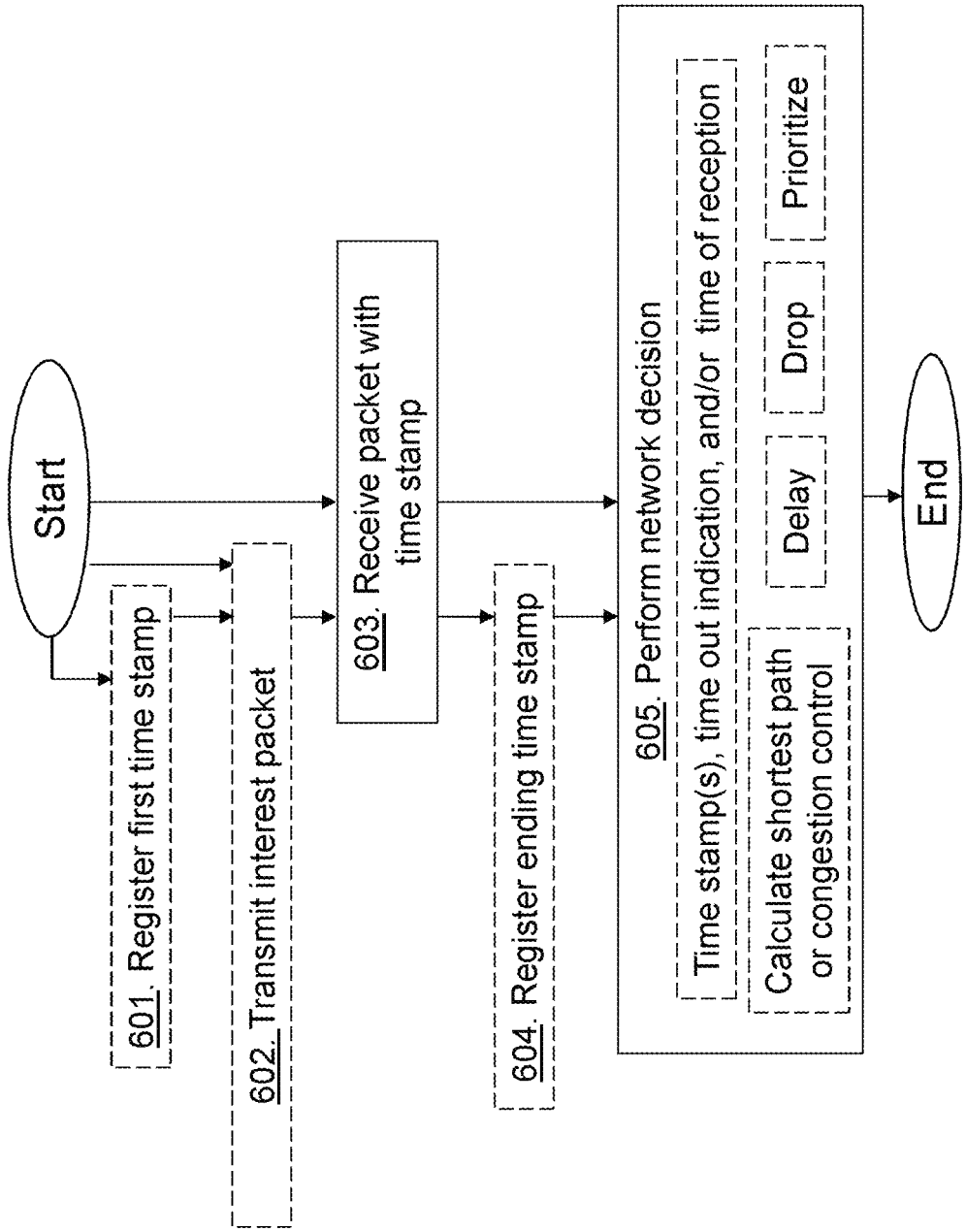
FIG. 6 is a flowchart depicting a method performed by a handling communication node according to embodiments herein.

The method actions performed by the handling communication node 10, exemplified herein as the originating communication node 10', the intermediate communication node 10", or the receiving communication node 10''', for handling packets in the communication network 1 according to some embodiments will now be described with reference to a flowchart depicted in FIG. 6. As stated above the communication network is an ICN network. The actions do not have to be taken in the order stated below, but may be taken in any suitable order. Actions performed in some embodiments are marked with dashed boxes.

Action 601. The handling communication node may register the first time stamp to the interest packet when transmitting the interest packet.

Action 602. The handling communication node may transmit the interest packet with the first time stamp towards the content communication node 11, which interest packet is indicating a request of content or requesting the content of the service and is of the format associated with the ICN network i.e. being an ICN packet.

Action 603. The handling communication node receives the packet with the time stamp, which packet is related to the service and is of the format associated with the ICN network, and the time stamp is comprised in the ICN header of the packet. The packet may in some embodiments further comprise the time out indication indicating when the packet should be timed out and the time stamp indicates when the packet is initially transmitted.

The received packet may be a data packet with a second time stamp, which data packet is associated with the transmitted interest packet. The data packet may be associated with the interest packet by the name of the content requested/provided.

Action 604. The handling communication node may register an ending time stamp when receiving the data packet.

Action 605. The handling communication node performs a network decision taking the time stamp in the packet into account, which network decision relates to handling the packet and/or other packets. The handling communication node may perform the network decision by making a handling decision based on the first and second time stamp. The first and second time stamp may be used to determine a hop time and this may be used to determine the hop to be congested or if there exist a different shortest path hence, the network decision may relate to calculate a shortest path or relate to congestion control. The handling communication node may perform the network decision by further taking, in addition to the first and second time stamp, the ending time stamp into account.

The handling communication node may perform the network decision based on the time stamp, the time out indication, and a time of reception of the packet at the handling communication node. The time of reception may be synchronized with a clock in the communication network. The time stamp, and the time of reception may indicate the delivery time indicating the time to deliver content of the service to the originating client or communication node. The handling communication node may perform the network decision by delaying transmission of the packet or content related to the packet, e.g. other packets, in case the delivery time indicates the time interval is equal to or below a threshold e.g. remaining time threshold being be based on the time out indication in the packet. The handling communication node may perform the network decision by dropping the packet in case the delivery time indicates a time interval above a threshold indicated by the time out indication, e.g. the time out indication may indicate that the packet will not be delivered before running out of time and the handling communication node may then drop the packet. The handling communication node may perform the network decision by prioritizing transmission of the packet or content related to the packet in relation to other transmissions of other packets based on the delivery time and the time out indication. E.g. if the packet is close to be delivered within the time out indication the packet may be prioritized before other packets that may be delayed and still make it within the time out indication of that packet.

Figure 7:
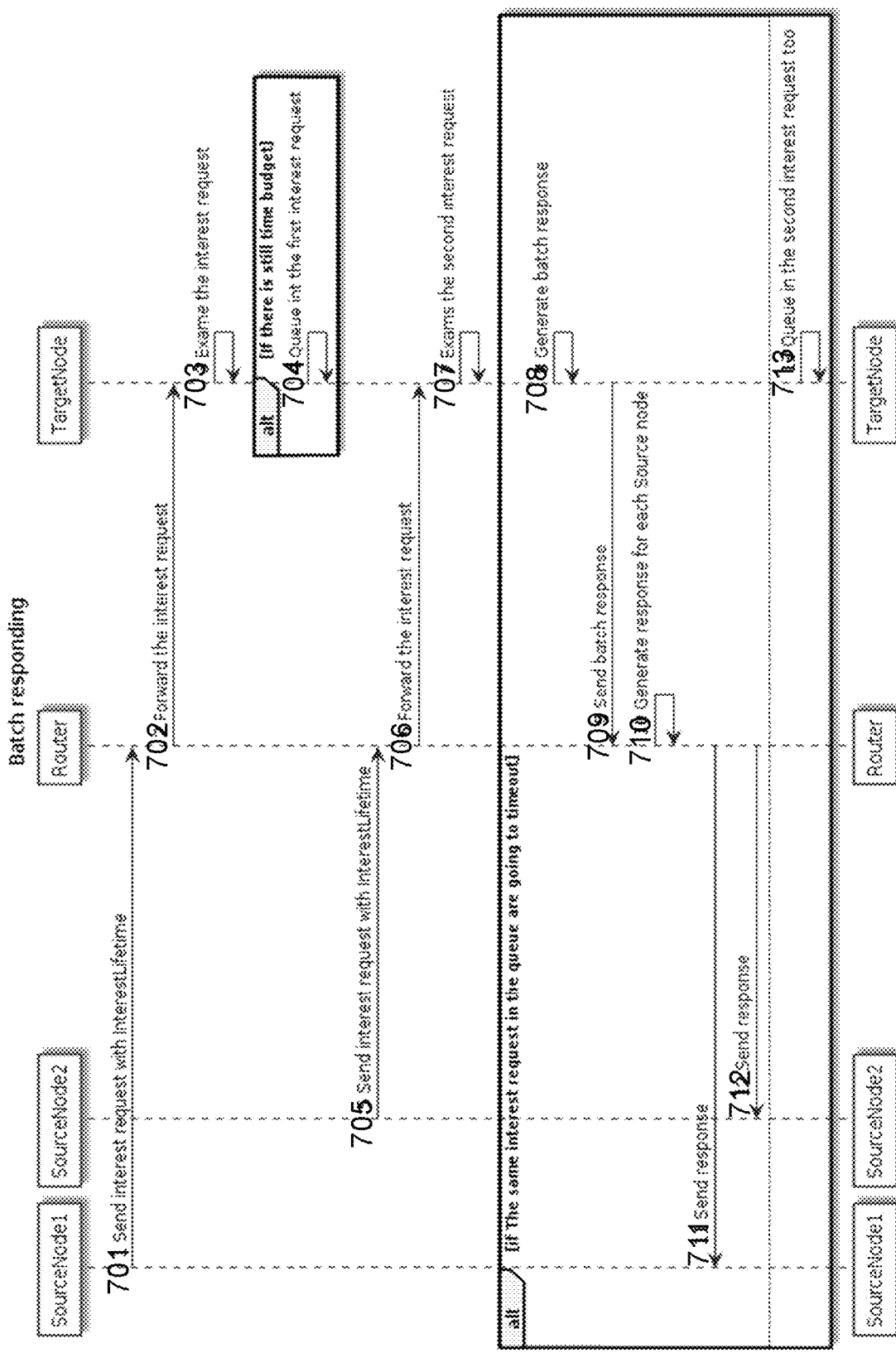
FIG. 7 is a signalling scheme according to some embodiments herein.

FIG. 7 is a signaling scheme according to some embodiments herein, wherein the time stamp is added to the interest packet and also the time out indication. Hence, the "InterestLifetime" header in the ICN header may be extended, not only to include a value indicating in how many milliseconds the interest times out, but to also include a field comprising the time stamp to indicate when the packet has been sent out.

```
InterestLifetime ::= INTEREST-LIFETIME-TYPE TLV-LENGTH
                        TimeoutValue?
                        SentTime?
TimeoutValue ::= TIMEOUT-VALUE-COMPONENTS-TYPE
TLV-LENGTH
                        nonNegativeInteger
SentTime ::= Sent-TIME-COMPONENTS-TYPE TLV-LENGTH
                        BYTE{4}
```

So, the InterestLifetime header may have two sub-components: Time out indication denoted as TimeoutValue, which indicates in how many milliseconds the interest timeouts; and the time stamp denoted as SentTime indicating when interest request has been sent out. For the value of SentTime, instead of using epoch Unix time, the time stamp may specify the number of milliseconds since 0:00 AM of same day, to fit it into 4 bytes.

According to embodiments herein packets are routed in ICN/NDN networks where the routing path is symmetric, the data packets follow exactly the same path as interest packets. This makes it possible to estimate the time for the data packet travelling through network (under assumption of the latency symmetry of the up- and downlinks).

Action 701. A source node, being an example of the communication node 10, transmits the interest packet with SentTime and TimeoutValue.

Action 702. A router forwards the interest packet.

Action 703. The target node, being an example of the handling communication node above, receives the interest packet with the SentTime and TimeoutValue and performs a network decision based on the SentTime and TimeoutValue.

For example, the time stamp SentTime in the interest packet is denoted as $T_0$ and the time when target communication node received the interest packet as $T_n$, the time spent processing the interest packet and generating a datapacket as $t_p$, and the TimeoutValue as $\Delta T$.

So an estimated time T when the source node will receive the data packet is:

$$T = T_n + (T_n - T_0) + t_p$$

To be able to receive the data packet before timeout, $$T <= T_0 + \Delta T$$

Since $T_0$, $T_n$ and $\Delta T$ are all fixed, the only variable, which target node can estimate (e.g., based on historical data) is $t_p$. The target node can estimate if it can generate a response, i.e. the data packet, and deliver in time; if there is still enough time budget, target node can queue the interest request and handle other requests first, action 704. Using a priority queue is one of the possible implementations.

Each communication node along the path may also utilize the symmetry for prioritization. Suppose a node receives an interest packet at time $T_a$, and the corresponding data packet at time $T_z$. Since, since the node knows how much time it will use to send back the packet to the source node, the data packet can be queued in order to process other packets with higher priority.

Similarly to the target node, the estimated time when the source node will receive the data packet from the intermediate node is:

$$T' = T_z + (T_a - T_0) + t_p'$$

where $t_p'$ is the time used to process the data packet and it is usually known by the node.

To be able to receive the response before timeout, $$T' <= T_0 + \Delta T$$

If the data packet is estimated not be delivered in time, the target node may choose not to answer or re-negotiate with the source node; and/or the intermediate node may choose not to forward the data packet and may as well send a control packet, similar to transmitting an Internet Control Message Protocol (ICMP) message in IP, to notify the source node. Also, all communication nodes along the path may timely check formula $T' <= T_0 + \Delta T$ by substituting $T_z$ with current time, if the formula doesn't hold, the communication node can delete the interest.

Action 705. A second source node transmits the interest packet of the same content with SentTime and TimeoutValue.

Action 706. A router forwards the interest packet.

Action 707. The target node receives the interest packet with the SentTime and TimeoutValue and exams the interest packet. For video streaming applications, many source nodes might request the same content at almost the same time. So target node can queue the same interest requests from different source nodes until there is still enough time budget.

Action 708. As the interest packets concern the same content and the interest packet of the first source node is closing in on the time out indication, the target node generates a batch response being a data packet for both source nodes. Hence, when the time budget runs out, the target node sends the responses back to all the source nodes at once. In the batch response, the target node may send the payload only once along with a list of recipient addresses (source nodes).

Action 709. The batch response is sent back to the router. This can reduce the network traffic between the routers and the target node.

Action 710. The router generates a data packet for each source node e.g. in the list in the batch response.

Action 711. The data packet is transmitted to the first source node.

Action 712. The corresponding data packet is transmitted to the second source node.

Action 713. The target node may queue the second interest request until timeout.

Embodiments herein thus adds, besides a field in ICN/NDN packet which indicate when the interest request should be timed out, ia new field indicting when the interest packet has been sent out indicated by the first time stamp. Based on the symmetric routing path principle in ICN/NDN network, the information about when the interest packet has been sent from client, the timespent processing the interest packet and generating the data packet, and also the timeout value of the interest packet, may be used to estimate the time for the data packet traveling through the communication network and the time when the response will arrive at client side. Based on the estimation when the data packet will arrive at client side and timeout value of when interest request will be timeout provided by client, communication nodes may make decisions about: if this interest packet can be handled in time; if this interest packet should be prioritized or down prioritized; and/or what is the process delay budget for this interest packet.

Figure 8:
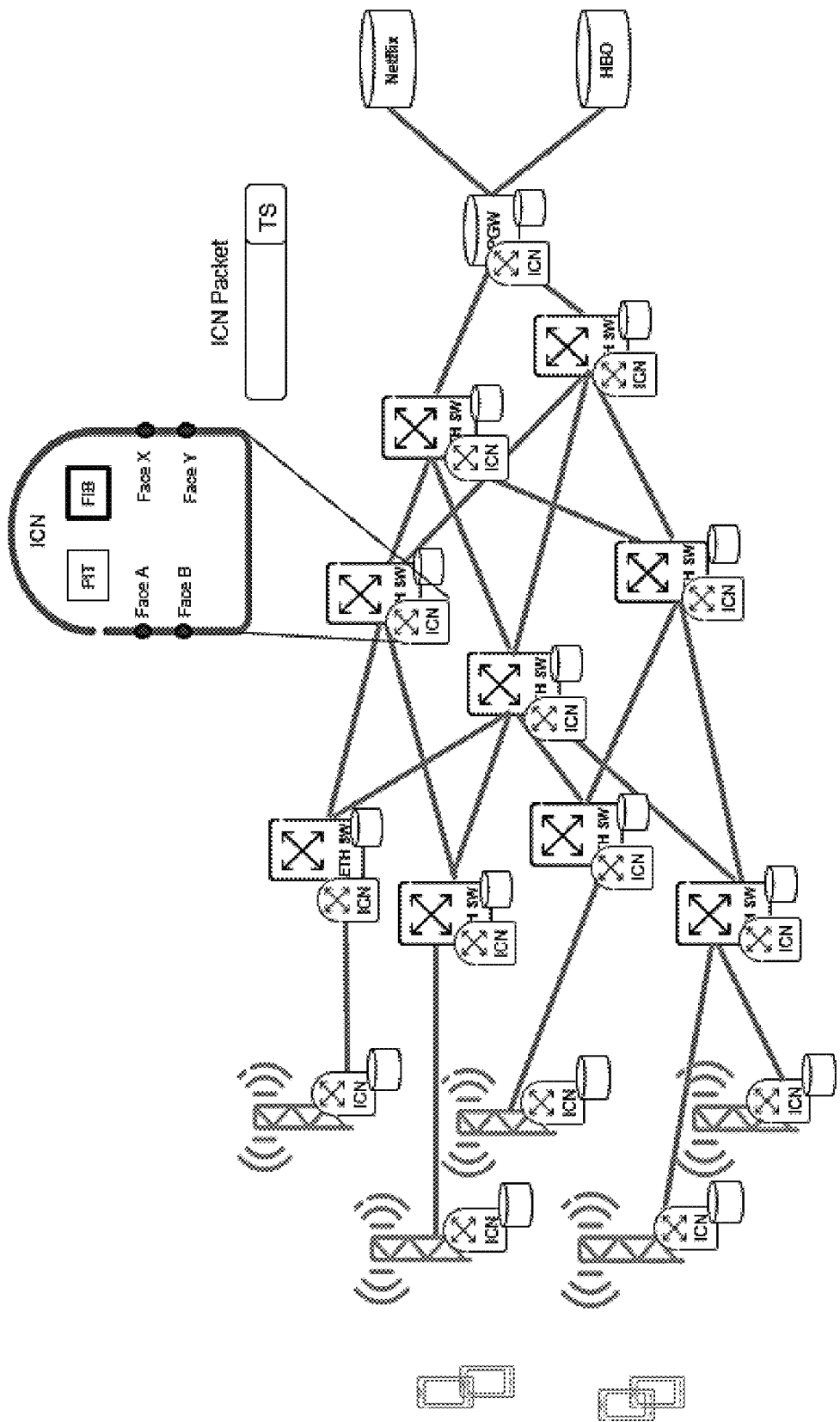
FIG. 8 is a schematic overview depicting a communication network according to some embodiments herein.

FIG. 8 shows that each communication node, e.g. router, gateway, base station etc, in a communication network has an ICN functionality.

The functional structure of an ICN node or functionality is shown in FIG. 8, indicating in particular the Forward Information Base (FIB) functionality. FIB entity is responsible for deciding on which face or port the packets will be forwarded, and four faces, Face A, Face B, Face X, and Face Y of the ICN communication node are displayed. Furthermore, handling communication nodes with FIB applying time stamp may, for each hop, store and process the time stamp information in each packet in the Forwarding Information Base, entity responsible for deciding which face or port the next packets will be forwarded. Thus, the FIB may decide to change the shortest path.

Figure 9:
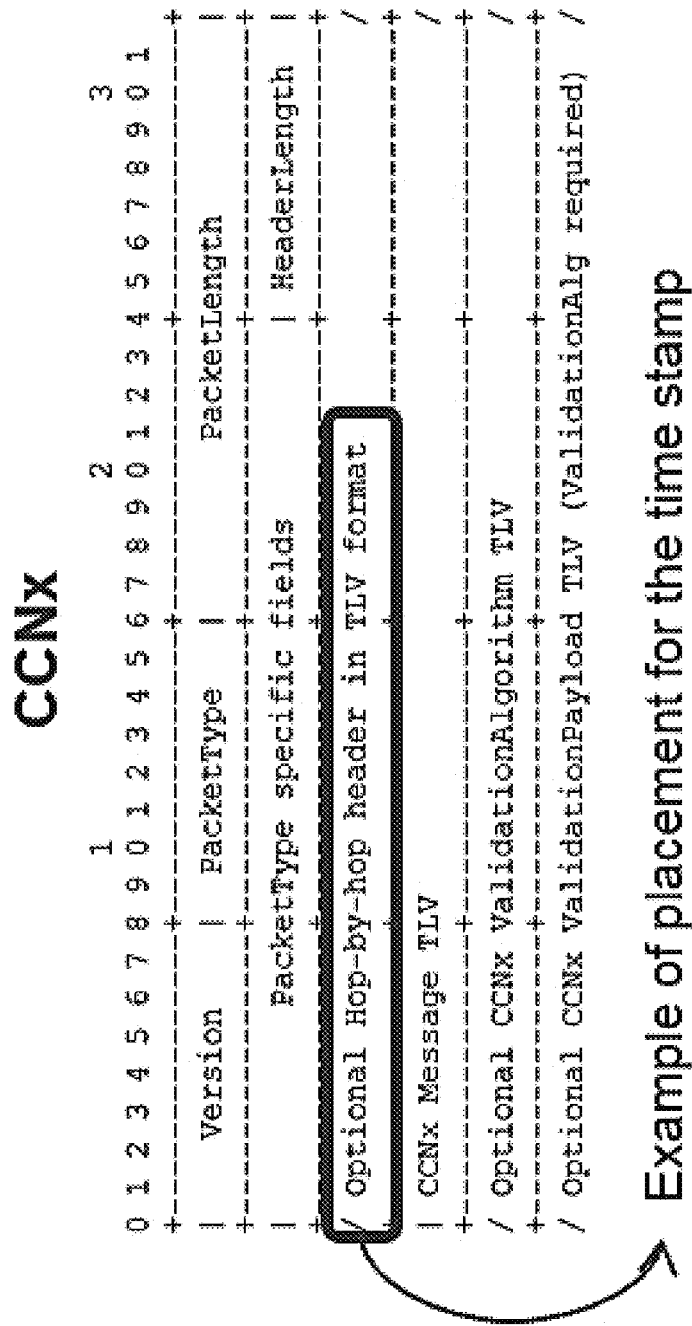
FIG. 9 is a schematic overview depicting an ICN packet with a time stamp

Embodiments herein include adding the time stamp in a ICN packet during e.g. a forwarding process. In FIG. 9, the time-stamp in e.g. a CCNx packet format, being an example of an ICN format, is placed in the optional hop by hop header in Type Length Value (TLV) format.

Figure 10:
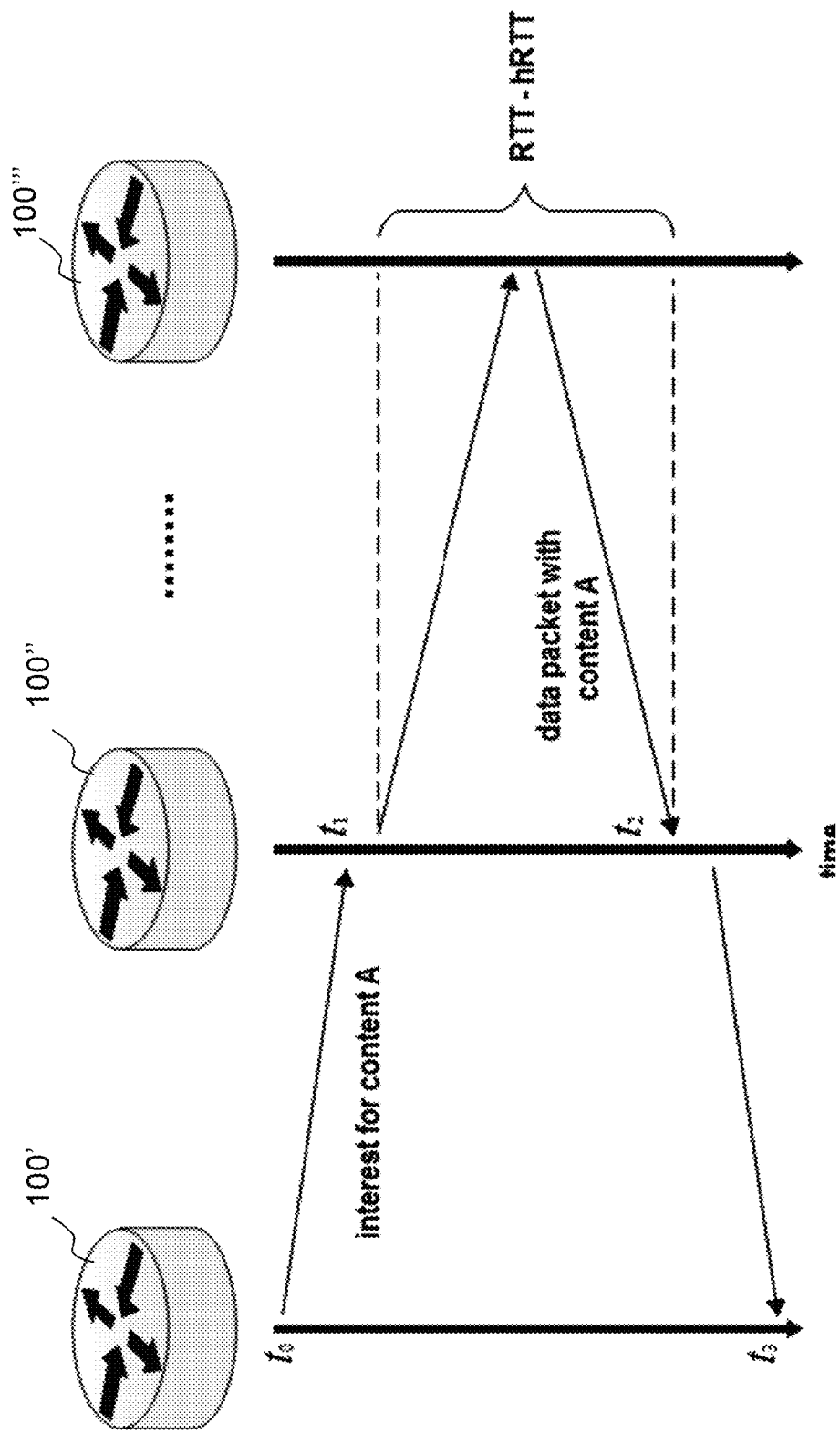
FIG. 10 is a signalling scheme according to some embodiments herein.

FIG. 10 illustrates the proposed method starting from a content request (interest packet for content A), traversal of the interest packet until the content is found at a router and then caching the requested data packets back to the starting router. Embodiments herein add the timestamp at each hop (router). The calculation of per hop round trip time, denoted here hRTT, is an example of processing that can be performed based in the time stamp information from ICN packets. A target router 100' forwards an interest packet for a content A to another router and adds a time t0 for transmitting the interest packet. A next-hop router 100" then records the time of arrival of this interest packet at ti, and forwards this interest packet to another router. The interest packet will continue to be forwarded until it arrives at a router 100''' that has content A. After this, the content packet (data packet) will do the reverse path until arriving at the next-hop router 100" again, where this time of arrival t2 will be recorded. This next-hop router 100", before sending content A to the target router 100', may add or just forward t1 and t2 in the header of the data packet of content A. In this way, when the content finally arrives at target router 100', the target router 100' record this time of arrival t3, and has access to all the four time-stamps t0, t1, t2 and t3. With the given time-stamps, hRTT can be calculated as:

$$hRTT=t3-t2+t1-t0$$

hRTT may then be used to determine a different shortest path or whether the hop is congested or not.

Figure 11:
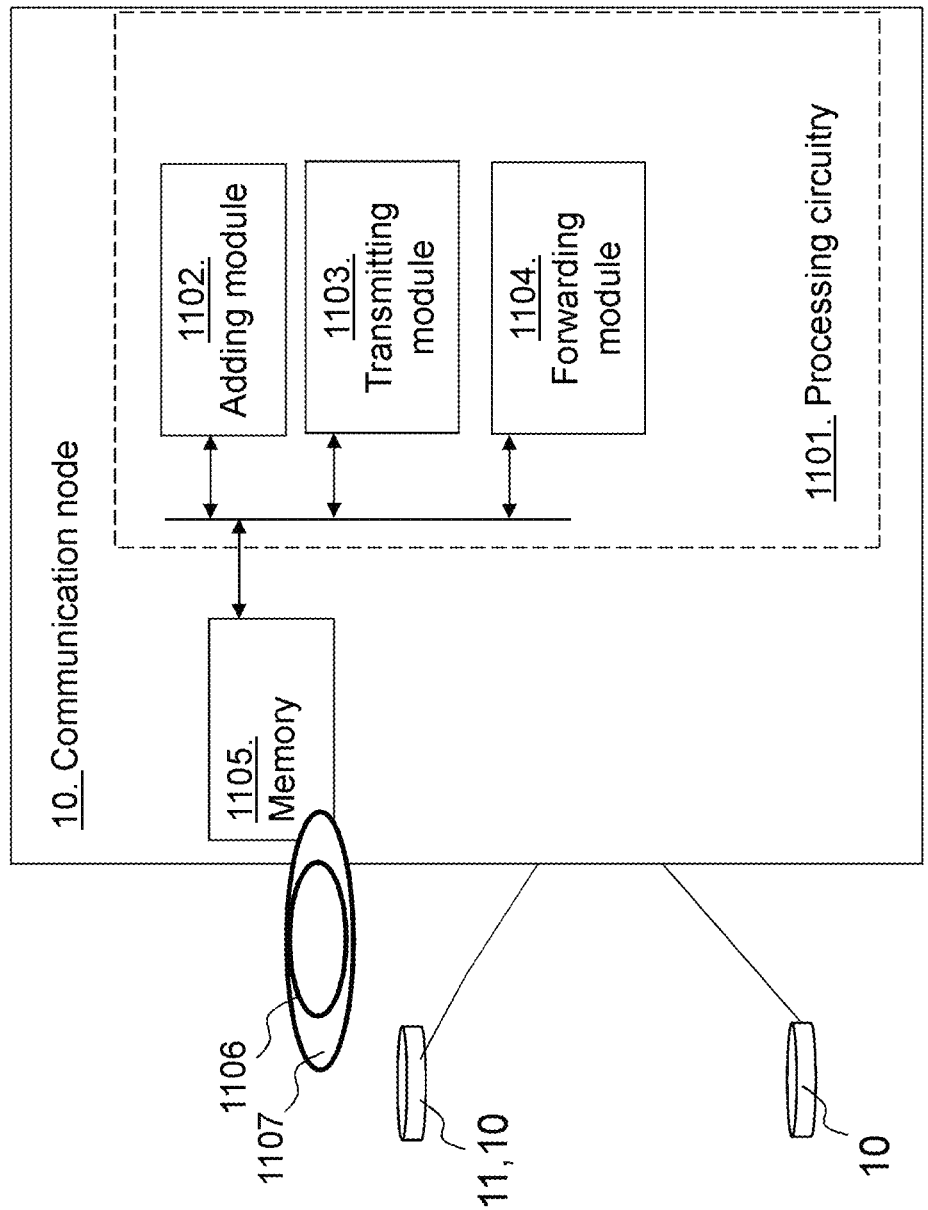
FIG. 11 is a block diagram depicting a communication node according to embodiments herein.

FIG. 11 is a block diagram depicting the communication node 10 for handling packets in the communication network according to embodiments herein. The communication network is ICN network. The communication node 10 may be denoted as a transmitting communication node.

The communication node 10 may comprise a processing circuitry 1101, e.g. one or more processors, configured to perform the methods herein.

The communication node may comprise an adding module 1102. The communication node 10, the processing circuitry 1101 and/or the adding module 1102 is configured to add the time stamp into the ICN header of the packet, which packet is related to the service i.e. the packet is requesting content of a service or comprises at least a part of the content of the service and is of a format associated with the ICN network.

The communication node 10 may comprise a transmitting module 1103, e.g. a transmitter or a transceiver. The communication node 10, the processing circuitry 1101 and/or the transmitting module 1103 is configured to transmit the packet with the added time stamp towards another communication node.

According to some embodiments the packet is an interest packet requesting content of the service and the added time stamp is a first time stamp. The communication node 10, the processing circuitry 1101 and/or the transmitting module 1103 may be configured to transmit the second time stamp to the data packet associated with the interest packet, which data packet comprises at least a part of the content of the service and the first time stamp of the interest packet and is of the format associated with the ICN network. The communication node may comprise a forwarding module 1104. The communication node 10, the processing circuitry 1101 and/or the forwarding module 1104 may be configured to forward the data packet with the first time stamp and the added second time stamp towards the source communication node e.g. associated or connected to a client requesting the service The first time stamp may be indicating a time of reception or transmission of the interest packet at the communication node 10 and the second time stamp may be indicating a time of reception of the data packet at the communication node. The time stamp may be an absolute time value or an interval value indicating a per hop time.

According to some embodiments the time stamp may indicate when the packet is transmitted from the communication node. The communication node 10, the processing circuitry 1101 and/or the adding module 1102 may then be configured to also the time out indication to the packet indicating when the packet should be timed out.

An assumption is that both source node such as an originating communication node and the communication node which implements this algorithm may have their clock synchronized in sub-millisecond precision. This can be done by equipping both communication nodes with e.g. a Global Positioning System (GPS)/Precise Positioning Service (PPS) module. PPS signals have an accuracy ranging from a 12 picoseconds to a few microseconds per second, or 2.0 nanoseconds to a few milliseconds per day based on the resolution and the accuracy of the device generating the signal.

The communication node 10 further comprises a memory 1105. The memory comprises one or more units to be used to store data on, such as full set of data of the resource, content, time stamps, routing information, applications to perform the methods disclosed herein when being executed, and similar.

The methods according to the embodiments described herein for the communication node 10 are respectively implemented by means of e.g. a computer program 1106 or a computer program product, comprising instructions, i.e., software code portions, which, when executed on at least one processor, cause the at least one processor to carry out the actions described herein, as performed by the communication node 10. The computer program 1106 may be stored on a computer-readable storage medium 1107, e.g. a disc or similar. The computer-readable storage medium 1107, having stored thereon the computer program, may comprise the instructions which, when executed on at least one processor, cause the at least one processor to carry out the actions described herein, as performed by the communication node 10. In some embodiments, the computer-readable storage medium may be a non-transitory computer-readable storage medium.

Figure 12:
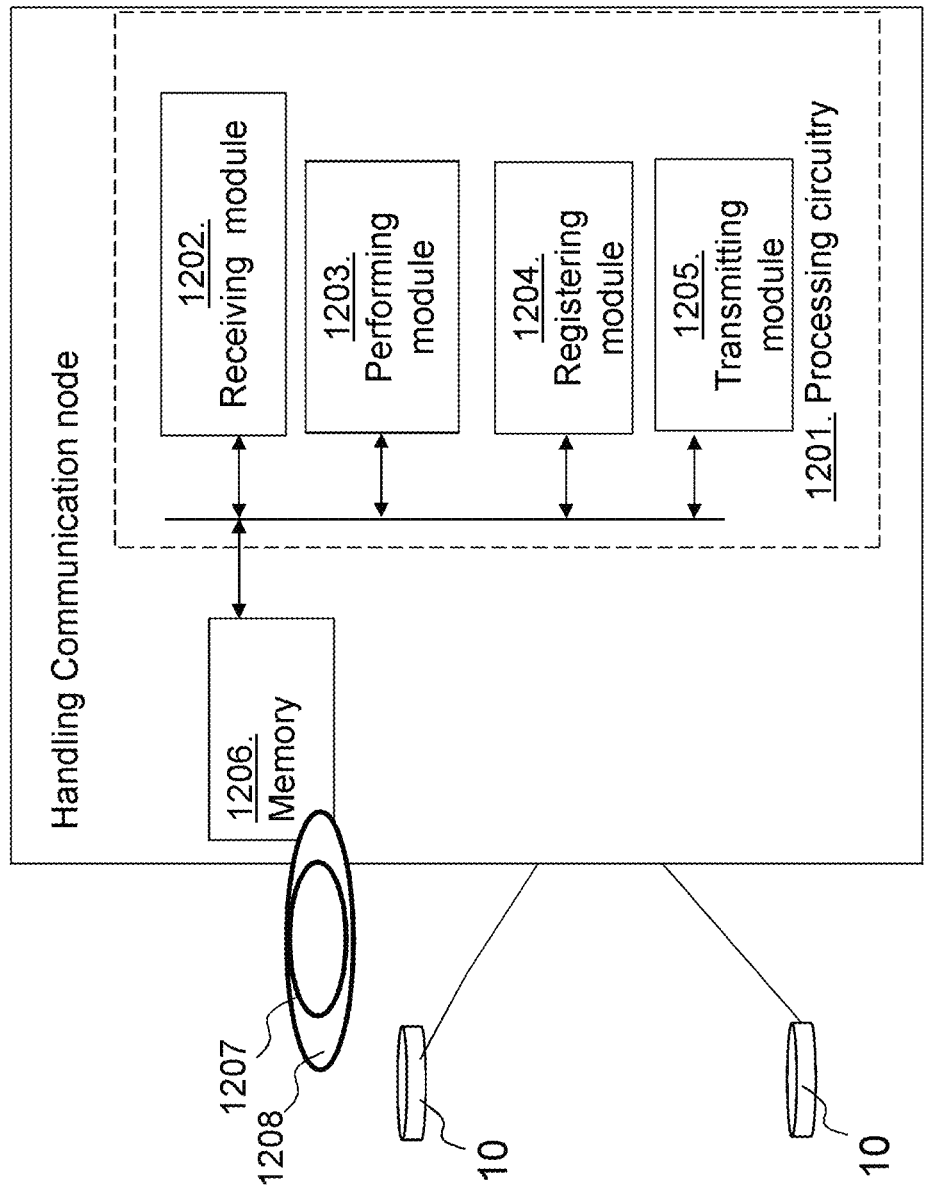
FIG. 12 is a block diagram depicting a handling communication node according to embodiments herein.

FIG. 12 is a block diagram depicting the handling communication node, e.g. the intermediate communication node, the originating communication node or the communication node comprising stored content requested, for handling packets in the communication network 1. The communication network is an ICN network. The handling communication node may be referred to as a receiving communication node.

The handling communication node may comprise a processing circuitry 1201, e.g. one or more processors, configured to perform the methods herein.

The handling communication node may comprise a receiving module 1202, e.g. a receiver or transceiver. The handling communication node, the processing circuitry 1201 and/or the receiving module 1202 is configured to receive the packet with the time stamp, which packet is related to the service and is of the format associated with the ICN network and the time stamp is comprised in an ICN header of the packet.

The handling communication node may comprise a performing module 1203. The handling communication node, the processing circuitry 1201 and/or the performing module 1203 is configured to perform the network decision taking the time stamp in the packet into account, which network decision relates to handling the packet and/or other packets.

The handling communication node may comprise a transmitting module 1204, e.g. a transmitter or transceiver. The handling communication node, the processing circuitry 1201 and/or the transmitting module 1204 may be configured to transmit the interest packet with the first time stamp towards the content communication node. The interest packet is requesting content of the service and is of the format associated with the ICN network and the received packet may be the data packet with the second time stamp, which data packet is associated with the transmitted interest packet. The handling communication node, the processing circuitry 1201 and/or the performing module 1203 may then be configured to perform the network decision by being configured to make the handling decision based on the first and second time stamp.

The handling communication node may comprise a registering module 1205. The handling communication node, the processing circuitry 1201 and/or the registering module 1205 may be configured to register the first time stamp to the interest packet when transmitting the interest packet. The handling communication node, the processing circuitry 1201 and/or the registering module 1205 may further be configured to register an ending time stamp when receiving the data packet. The handling communication node, the processing circuitry 1201 and/or the performing module 1203 may then be configured to perform the network decision taking, in addition to the first and second time stamp, the ending time stamp into account. The network decision may relate to calculate the shortest path or relate to congestion control, e.g. determining whether the present shortest path is congested when compared to other paths i.e. packets travel faster through another path.

In some embodiments the packet further comprises the time out indication indicating when the packet should be timed out and the time stamp indicates when the packet is initially transmitted. The handling communication node, the processing circuitry 1201 and/or the performing module 1203 may then be configured to the network decision based on the time stamp, the time out indication, and a time of reception of the packet at the handling communication node. The time of reception may be synchronized with a clock in the communication network. The time stamp and the time of reception may indicate the delivery time indicating the time to deliver content of the service to the originating client or communication node. The handling communication node, the processing circuitry 1201 and/or the performing module 1203 may then be configured to perform the network decision by being configured to delay transmission of the packet or content related to the packet in case the delivery time indicates a time interval equal to or below a threshold indicated by the time out indication. Alternatively or additionally, the handling communication node, the processing circuitry 1201 and/or the performing module 1203 may then be configured to perform the network decision by being configured to drop the packet in case the delivery time indicates a time interval above a threshold indicated by the time out indication. Alternatively or additionally, the handling communication node, the processing circuitry 1201 and/or the performing module 1203 may then be configured to perform the network decision by being configured to prioritize transmission of the packet or content related to the packet in relation to other transmissions of other packets based on the delivery time and the time out indication.

The handling communication node which implements this algorithm may have its clock synchronized in sub-millisecond precision with other communication nodes in the communication network. This can be done by equipping the handling communication node with e.g. a GPS/PPS module. PPS signals have an accuracy ranging from a 12 picoseconds to a few microseconds per second, or 2.0 nanoseconds to a few milliseconds per day based on the resolution and the accuracy of the device generating the signal.

The handling communication node further comprises a memory 1206. The memory comprises one or more units to be used to store data on, such as content, time stamps, routing information, applications to perform the methods disclosed herein when being executed, and similar.

The methods according to the embodiments described herein for the handling communication node are respectively implemented by means of e.g. a computer program 1207 or a computer program product, comprising instructions, i.e., software code portions, which, when executed on at least one processor, cause the at least one processor to carry out the actions described herein, as performed by the handling communication node. The computer program 1207 may be stored on a computer-readable storage medium 1208, e.g. a disc or similar. The computer-readable storage medium 1208, having stored thereon the computer program, may comprise the instructions which, when executed on at least one processor, cause the at least one processor to carry out the actions described herein, as performed by the handling communication node. In some embodiments, the computer-readable storage medium may be a non-transitory computer-readable storage medium.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first communication node for handling packets in an information centric networking, ICN, network, the method comprising:
    adding a first time stamp to an ICN header of a packet, the packet requesting content of a service or including at least a part of the content of the service and being of a format associated with the ICN network, the first time stamp indicating a transmission time of the packet;
    adding a second time stamp to the ICN header of the packet, the second time stamp indicating an absolute deadline associated with the packet; and
    transmitting the packet with the first time stamp and the second time stamp towards a second communication node.

2. The method of claim 1, wherein the first time stamp is an absolute time value or an interval value indicating a per hop time.

3. A method performed by a first communication node for handling packets in an information centric networking, ICN, network, the method comprising:
    receiving a packet with a first time stamp and a second time stamp in an ICN header of the packet from a second communication node, the packet being related to a service and being of a format associated with the ICN network, the first time stamp indicating a transmission time of the packet, the second time stamp indicating an absolute deadline associated with the packet; and
    performing a network decision relating to handling the packet and/or other packets based on the first time stamp and the second time stamp in the packet.

4. The method of claim 3, and wherein performing the network decision comprises determining whether to forward the packet to a third communication node based on the first time stamp and-second time stamp.

5. The method of claim 4, wherein determining whether to forward the packet to the third communication node comprises:
    determining a communication path of a plurality of communication paths between the first communication node and a fourth communication node based on the deadline, the communication path including the third communication node; and
    determining to forward the packet to the third communication device based on an expected time associated with the communication path and the deadline.

6. The method of claim 3, wherein determining whether to forward the packet to the third communication node comprises:
    determining not to forward the packet and to drop the packet.

7. The method of claim 6, wherein transmission time and the deadline are synchronized with a clock in the ICN network.

8. The method of claim 3, wherein performing the network decision comprises delaying transmission of the packet or content related to the packet in response to a delivery time of the packet indicating a time interval equal to or below a threshold indicated by the deadline.

9. The method of claim 3, wherein performing the network decision comprises dropping the packet in response to a delivery time of the packet indicating a time interval above a threshold indicated by the-deadline.

10. The method of claim 3, wherein performing the network decision comprises prioritizing transmission of the packet or content related to the packet in relation to other transmissions of other packets based on a delivery time of the packet and the deadline.

11. The method of claim 1, further comprising:
    selecting a communication path of a plurality of communication paths between the first communication node and the second communication node based on the deadline.

12. The method of claim 1, wherein the packet is a second packet, the method further comprising:
    receiving a first packet with a third time stamp and a fourth time stamp in an ICN header of the first packet from a third communication node, the first packet being related to the service and being of the format associated with the ICN network;
    generating the second packet based on the first packet; and
    determining the second time stamp based on the fourth time stamp.

13. The method of claim 12, wherein the first packet includes a request for the service, and
    wherein the second packet includes the request for the service.

14. The method of claim 12, wherein the first packet includes content associated with the service, and
    wherein the second packet includes content associated with the service.

15. The method of claim 12, wherein the first packet includes a request for the service, and
    wherein the second packet includes content associated with the service.

16. The method of claim 12, further comprising:
    responsive to receiving the first packet, determining to delay transmitting the second packet based on the fourth time stamp,
    wherein transmitting the second packet comprises, responsive to the delay elapsing, transmitting the second packet towards the second communication node.

17. The method of claim 12, wherein determining to transmit the packet to the second communication node comprises determining that:

$$T0+ED-tp \geq 2*LT,$$

where T0 is a value associated with the third time stamp, ED is the absolute deadline, tp is a processing time associated with the first communication node processing the first packet, and LT is a received local time associated with reception of the first packet by the first communication node.

18. The method of claim 4, wherein determining whether to forward the packet to the communication node comprises determining whether:

$$T0+ED-tp<2*LT,$$

where T0 is a value associated with the first time stamp, ED is the absolute deadline, tp is a processing time associated with the communication node processing the packet, and LT is a received local time associated with reception of the packet.

19. A first communication node for handling packets in an information centric networking, ICN, network, the communication node comprising:
  processing circuitry; and
  memory coupled to the processing circuitry and having instructions stored therein that are executable by the processing circuitry to cause the communication node to perform operations comprising:
    adding a first time stamp to an ICN header of a packet, the packet requesting content of a service or including at least a part of the content of the service and being of a format associated with the ICN network, the first time stamp indicating a transmission time of the packet;
    adding a second time stamp to the ICN header of the packet, the second time stamp indicating a deadline associated with the packet; and
    transmitting the packet with the first time stamp and the second time stamp towards a second communication node.

20. A first communication node for handling packets in an information centric networking, ICN, network, the handling communication node comprising:
  processing circuitry; and
  memory coupled to the processing circuitry and having instructions stored therein that are executable by the processing circuitry to cause the handling communication node to perform operations comprising:
    receiving a packet with a first time stamp and a second time stamp in an ICN header of the packet from a second communication node, the packet being related to a service and being of a format associated with the ICN network, the first time stamp indicating a transmission time of the packet, the second time stamp indicating a deadline associated with the packet; and
    performing a network decision relating to handling the packet and/or other packets based on the first time stamp and the second time stamp in the packet.

* * * * *

UNITED STATES PATENT AND TRADEMARK OFFICE
CERTIFICATE OF CORRECTION

| | | |
|---|---|---|
| PATENT NO. | : 11,973,683 B2 | Page 1 of 1 |
| APPLICATION NO. | : 16/480397 | |
| DATED | : April 30, 2024 | |
| INVENTOR(S) | : Inam et al. | |

It is certified that error appears in the above-identified patent and that said Letters Patent is hereby corrected as shown below:

On the Title Page

In Item (72), under "Inventors", in Column 1, Line 2, delete "Belem" and insert -- Belém --, therefor.

In the Specification

In Column 15, Line 35, delete "at ti," and insert -- at t1, --, therefor.

Signed and Sealed this
Twenty-second Day of October, 2024

Katherine Kelly Vidal
*Director of the United States Patent and Trademark Office*